(12) United States Patent
Murrish et al.

(10) Patent No.: US 8,967,112 B2
(45) Date of Patent: Mar. 3, 2015

(54) FOUR COUNTERWEIGHT CRANKSHAFT FOR 90 DEGREE V6 ENGINE

(71) Applicant: GM Global Technology Operations LLC, Detroit, MI (US)

(72) Inventors: Dale Edward Murrish, Troy, MI (US); Donald J. Perella, Troy, MI (US); Keith Hart, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 161 days.

(21) Appl. No.: 13/679,118

(22) Filed: Nov. 16, 2012

(65) Prior Publication Data

US 2014/0137835 A1    May 22, 2014

(51) Int. Cl.
*F16J 15/26*    (2006.01)
(52) U.S. Cl.
USPC .................................... 123/197.4; 123/192.1
(58) Field of Classification Search
USPC ............ 123/192.1, 192.2, 197.4; 74/604, 595
IPC ................................. F16F 15/283; F02B 75/22
See application file for complete search history.

(56) References Cited

U.S. PATENT DOCUMENTS

| 4,730,512 | A | * | 3/1988 | Ito et al. ........................... 74/595 |
| 5,195,398 | A |   | 3/1993 | Murrish et al. |
| 5,481,942 | A | * | 1/1996 | Baek ............................... 74/603 |
| 6,324,942 | B1 | * | 12/2001 | Koike et al. ..................... 74/603 |
| 7,234,432 | B2 | * | 6/2007 | Nagira et al. ............... 123/192.2 |

* cited by examiner

*Primary Examiner* — M. McMahon
(74) *Attorney, Agent, or Firm* — Quinn Law Group, PLLC

(57) ABSTRACT

A crankshaft includes first, second, third, and fourth main journals, each coaxially disposed along a crankshaft axis. A first, second, third, fourth, fifth, and sixth crank pin are each parallel with the crankshaft axis, and radially offset from the crankshaft axis. A first crank arm includes a first counterweight, and connects the first main journal and the first crank pin. A third crank arm includes a second counterweight, and connects the second crank pin and the second main journal. A seventh crank arm includes a third counterweight, and connects the third main journal and the fifth crank pin. A ninth crank arm includes a fourth counterweight, and connects the sixth crank pin and the fourth main journal. The first, second, third, and fourth counterweights are the only counterweights of the crankshaft.

19 Claims, 2 Drawing Sheets

FOUR COUNTERWEIGHT CRANKSHAFT FOR 90 DEGREE V6 ENGINE

TECHNICAL FIELD

The invention generally relates to a crankshaft for an internal combustion engine, and more specifically to a crankshaft for a ninety degree V-style engine having six cylinders.

BACKGROUND

An engine's crankshaft converts reciprocating linear movement of a piston into rotational movement about a crankshaft axis to provide torque to propel a vehicle, such as but not limited to a train, a boat, a plane, or an automobile. Crankshafts are a vital part of an engine, and are a starting point of engine design. Crankshaft design affects the overall packaging of the engine, and thereby the total mass of the engine. Accordingly, minimizing the size and/or mass of the crankshaft reduces the size and mass of the engine, which has a compounding affect on the overall size, mass and fuel economy of the vehicle.

The crankshaft includes at least one crankpin that is offset from the crankshaft axis, to which a reciprocating piston is attached via a connecting rod. Force applied from the piston to the crankshaft through the offset connection therebetween generates torque in the crankshaft, which rotates the crankshaft about the crankshaft axis. The crankshaft further includes at least one main bearing journal disposed concentrically about the crankshaft axis. The crankshaft is secured to an engine block at the main bearing journals. A bearing is disposed about the main bearing journal, between the crankshaft and the engine block. The crankshaft further includes a plurality of counterweights. For example, a crankshaft for a 90 degree V-6 engine typically includes six counterweights. The counterweights are typically connected to a crank arm, which connects one of the crank pins to the main bearing journals. The counterweights are used to offset the weight of the pistons and the rods, and must be positioned and orientated on the crankshaft to balance the sum of all of the forces acting on the shaft.

SUMMARY

A crankshaft for a ninety degree V-type six cylinder engine is provided. The crankshaft includes a first crank arm extending between a first main journal and a first crank pin. A second flying arm extends between the first crank pin and a second crank pin. A third crank arm extends between the second crank pin and a second main journal. A fourth crank arm extends between the second main journal and a third crank pin. A fifth flying arm extends between the third crank pin and a fourth crank pin. A sixth crank arm extends between the fourth crank pin and a third main journal. A seventh crank arm extends between the third main journal and a fifth crank pin. An eighth flying arm extends between the fifth crank pin and a sixth crank pin. A ninth crank arm extends between the sixth crank pin and a fourth main journal. The first main journal, the second main journal, the third main journal, and the fourth main journal are each disposed coaxial with each other and extend along and are disposed concentrically about a crankshaft axis. The first crank pin, the second crank pin, the third crank pin, the fourth crank pin, the fifth crank pin, and the sixth crank pin are each disposed parallel with and laterally offset from the crankshaft axis. The crankshaft further includes a first counterweight connected to the first crank arm, a second counterweight connected to the third crank arm, a third counterweight connected to the seventh crank arm, and a fourth counterweight connected to the ninth crank arm. The first counterweight, the second counterweight, the third counterweight, and the fourth counterweight are the only counterweights connected to the arms.

Accordingly, the crankshaft includes only 4 counterweights, instead of the standard six used in the prior art, thereby reducing the weight and mass of the crankshaft.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a crankshaft is generally shown at 20. The crankshaft 20 is for a ninety degree) (90°) V-type six cylinder engine.

Figure 1:
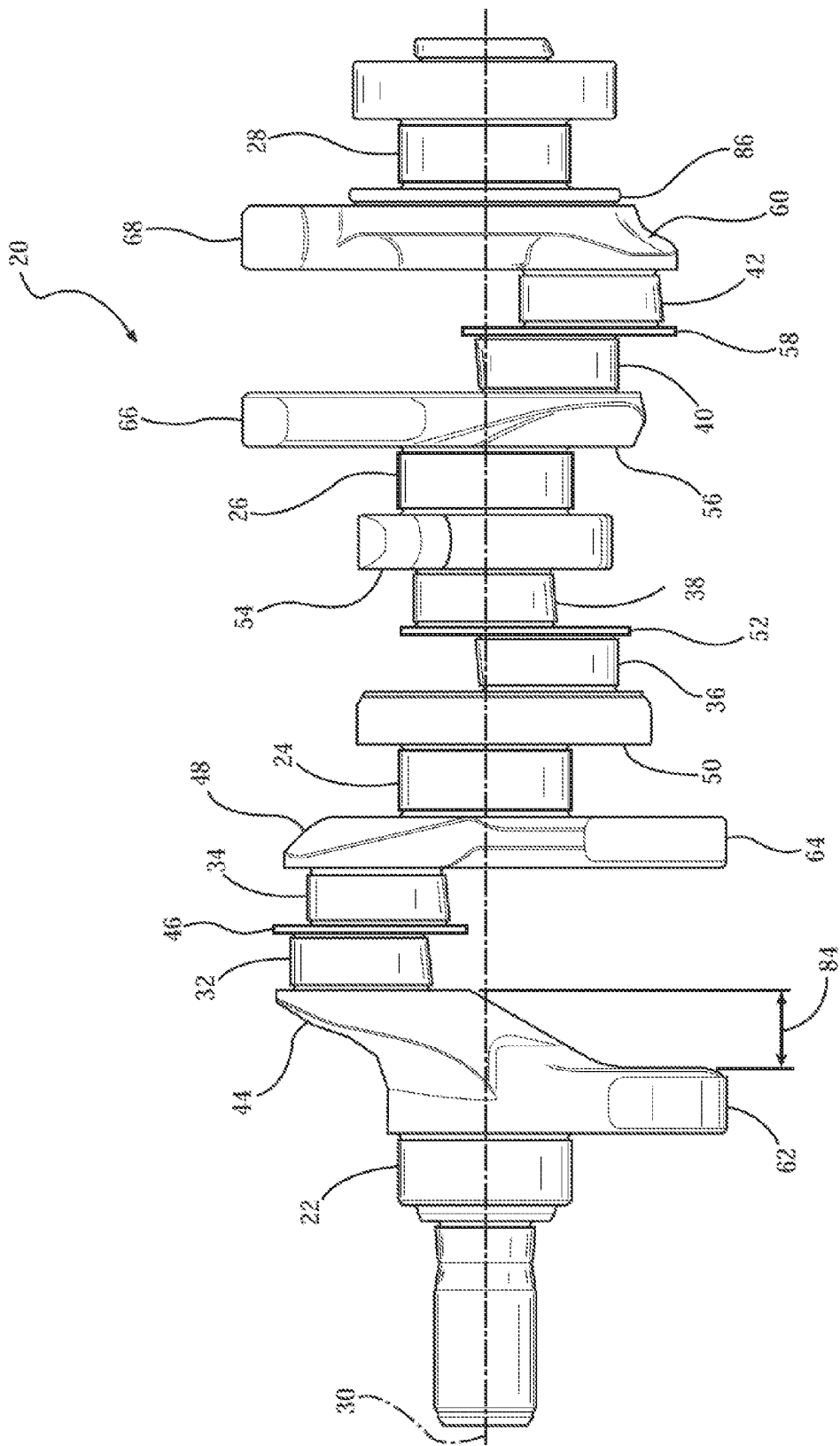
FIG. 1 is a schematic plan view of a crankshaft.

Referring to FIG. 1, the crankshaft 20 includes a first main journal 22, a second main journal 24, a third main journal 26, and a fourth main journal 28. The first main journal 22, the second main journal 24, the third main journal 26, and the fourth main journal 28 are each coaxially aligned with each other, and extend along and are disposed concentrically about a crankshaft axis 30.

The crankshaft 20 further includes a first crank pin 32, a second crank pin 34, a third crank pin 36, a fourth crank pin 38, a fifth crank pin 40, and a sixth crank pin 42. The first crank pin 32, the second crank pin 34, the third crank pin 36, the fourth crank pin 38, the fifth crank pin 40, and the sixth crank pin 42 are each disposed parallel with the crankshaft axis 30, and are each laterally offset from the crankshaft axis 30.

A first crank arm 44 extends between and connects the first main journal 22 and the first crank pin 32. A second flying arm 46 extends between and connects the first crank pin 32 and the second crank pin 34. A third crank arm 48 extends between and connects the second crank pin 34 and the second main journal 24. A fourth crank arm 50 extends between and connects the second main journal 24 and the third crank pin 36. A fifth flying arm 52 extends between and connects the third crank pin 36 and the fourth crank pin 38. A sixth crank arm 54 extends between and connects the fourth crank pin 38 and the third main journal 26. A seventh crank arm 56 extends between and connects the third main journal 26 and the fifth crank pin 40. An eighth flying arm 58 extends between and connects the fifth crank pin 40 and the sixth crank pin 42. A ninth crank arm 60 extends between and connects the sixth crank pin 42 and the fourth main journal 28. As used herein, the term "crank arm" is used to define an arm connecting a main journal to a crank pin, and the term "flying arm" is used to define an arm connecting two adjoining crank pins. It should be appreciated that the broad term "arm(s)" may be used herein to describe and include both the crank arms and the flying arms. Accordingly, the arms of the crankshaft 20 include all of the first crank arm 44, the third crank arm 48, the fourth crank arm 50, the sixth crank arm 54, the seventh crank arm 56, and the ninth crank arm 60, as well as the second flying arm 46, the fifth flying arm 52, and the eighth flying arm 58.

The crankshaft 20 includes four counterweights. A first counterweight 62 is connected to the first crank arm 44, a second counterweight 64 is connected to the third crank arm 48, a third counterweight 66 is connected to the seventh crank arm 56, and a fourth counterweight 68 is connected to the ninth crank arm 60. The first counterweight 62, the second counterweight 64, the third counterweight 66, and the fourth counterweight 68 are the only counterweights connected to the arms. As used herein, the term counterweight includes any structure connected to one of the arms that extends radially outward away from the crankshaft axis 30, and is used to balance the forces applied to the crankshaft 20 by the pistons and connecting rods of the engine. Notably, the crankshaft 20 is characterized by the lack or absence of one or more counterweights connected to any of the fourth crank arm 50 or the sixth crank arm 54, or to any of the second flying arm 46, the fifth flying arm 52, or the eighth flying arm 58.

Figure 2:
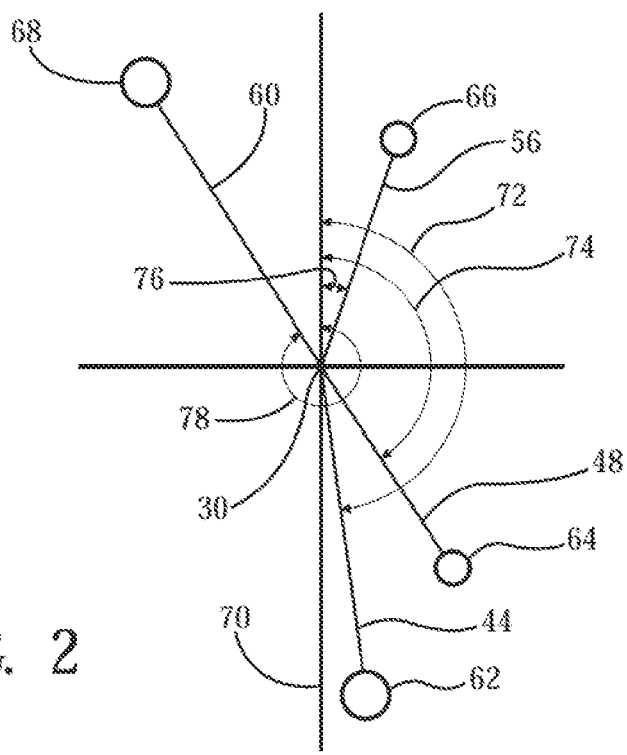
FIG. 2 is a schematic end view of the crankshaft showing an angular position of each of a plurality of counterweights.

Referring to FIG. 2, a crankshaft plane 70 extends through a central axis of the first crank pin 32 and the crankshaft axis 30. The first counterweight 62 is oriented so that a plane extending from a center of gravity of the first counterweight 62 to the crankshaft axis 30 is rotated a first rotation angle 72 that is between the range of 170 degrees and 190 degrees from the crankshaft plane 70 in a clockwise direction. Preferably, the first counterweight 62 is oriented so that the first rotation angle 72 is approximately equal to 178 degrees. The second counterweight 64 is oriented so that a plane extending from a center of gravity of the second counterweight 64 to the crankshaft axis 30 is rotated a second rotation angle 74 that is between the range of 135 degrees and 155 degrees from the crankshaft plane 70 in a clockwise direction. Preferably, the second counterweight 64 is oriented so that the second rotation angle 74 is approximately equal to 145 degrees. The third counterweight 66 is oriented so that a plane extending from a center of gravity of the third counterweight 66 to the crankshaft axis 30 is rotated a third rotation angle 76 that is between the range of 5 degrees and 25 degrees from the crankshaft plane 70 in a clockwise direction. Preferably, the third counterweight 66 is oriented so that the third rotation angle 76 is approximately equal to 15 degrees. The fourth counterweight 68 is oriented so that a plane extending from a center of gravity of the fourth counterweight 68 to the crankshaft axis 30 is rotated a fourth rotation angle 78 between the range of 310 degrees and 330 degrees from the crankshaft plane 70 in a clockwise direction. Preferably, the fourth counterweight 68 is oriented so that the fourth rotation angle 78 is approximately equal to 320 degrees.

Figure 3:
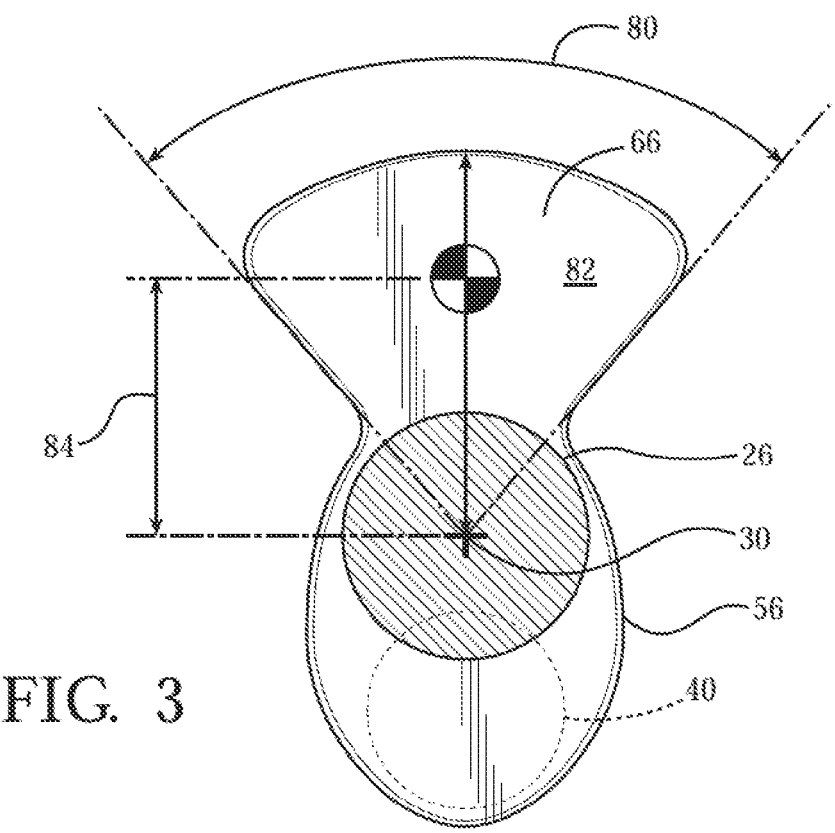
FIG. 3 is a schematic cross sectional view of the crankshaft perpendicular to a crankshaft axis.

Referring to FIG. 3, the third counterweight 66 is shown to identify variable dimensions, i.e., a dovetail angle 80 and a dovetail Weighted Radius (WR) 82, that is common to each of the first counterweight 62, the second counterweight 64, the third counterweight 66 and the fourth counterweight 68. As used herein, the term dovetail angle 80 is defined as an angle for an equivalent pie shaped section of material added to a crank arm, such as crank arm 56 shown in FIG. 3, to balance the crank arm and the rest of the crankshaft and cranktrain components. The actual geometry may differ because of casting or forging draft or other reasons, but the dovetail angle 80 is the equivalent pie shaped section simplified for calculation purposes. The first counterweight 62, the third counterweight 66, and the fourth counterweight 68 each include a dovetail angle 80 of between 120 degrees and 140 degrees. Preferably, the dovetail angle 80 of the first counterweight 62 is approximately equal to 133 degrees, the dovetail angle 80 of the third counterweight 66 is approximately equal to 130 degrees, and the dovetail angle 80 of the fourth counterweight 68 is approximately equal to 130 degrees. The second counterweight 64 includes a dovetail angle 80 of between 100 degrees and 120 degrees. Preferably, the dovetail angle 80 of the second counterweight 64 is approximately equal to 112 degrees.

As used herein the term dovetail WR 82 is defined as the mass of a counterweight, such as counterweight 66 shown in FIG. 3, multiplied by a distance 84 measured from the crankshaft axis 30 to the center of mass of the counterweight. The first counterweight 62 includes a dovetail WR 82 between the range of 60 Kilogram Millimeters (KgMm) and 80 KgMm. Preferably, the dovetail WR 82 of the first counterweight 62 is approximately equal to 74 KgMm. The second counterweight 64 includes a dovetail WR 82 between the range of 40 KgMm and 60 KgMm. Preferably, the dovetail WR 82 of the second counterweight 64 is approximately equal to 53 KgMm. The third counterweight 66 includes a dovetail WR 82 between the range of 50 KgMm and 70 KgMm. Preferably, the dovetail WR 82 of the third counterweight 66 is approximately equal to 60 KgMm. The fourth counterweight 68 includes a dovetail WR 82 between the range of 50 KgMm and 70 KgMm. Preferably, the dovetail WR 82 of the fourth counterweight 68 is approximately equal to 60 KgMm.

The first counterweight 62 includes a mass of between 1200 grams and 1400 grams. Preferably, the mass of the first counterweight 62 is approximately equal to 1310 grams. The second counterweight 64 includes a mass of between 750 grams and 950 grams. Preferably, the mass of the second counterweight 64 is approximately equal to 870 grams. The third counterweight 66 includes a mass of between 950 grams and 1150 grams. Preferably, the mass of the third counterweight 66 is approximately equal to 1050 grams. The fourth counterweight 68 includes a mass of between 900 grams and 1100 grams. Preferably, the mass of the fourth counterweight 68 is approximately equal to 1000 grams.

Referring back to FIG. 1, the crankshaft 20 may include a separation distance 84. The separation distance 84 is measured axially along the crankshaft axis 30. The separation distance 84 is disposed between either the first crank arm 44 and the first crank pin 32, or between the sixth crank pin 42 and the ninth crank arm 60. As shown in FIG. 1, the separation distance 84 is shown between the first crank arm 44 and the first crank pin 32. However, it should be appreciated that the separation distance 84 may alternatively be disposed between the sixth crank pin 42 and the ninth crank arm 60. The separation distance 84 may include a distance measured along the crankshaft axis 30 that is between the range of two mm (2 mm) and forty millimeters (40 mm). Preferably, the separation distance 84 is approximately equal to 24 millimeters.

The crankshaft 20 may further include a reluctor wheel 86, i.e., a crankshaft 20 timing wheel. The reluctor wheel 86 operates as is known in the art to identify a rotational position of the crankshaft 20 about the crankshaft axis 30. Preferably, the reluctor wheel 86 is disposed between the ninth crank arm 60 and the fourth main journal 28. The reluctor wheel 86 may be either pressed or bolted onto the crankshaft 20 as is known in the art.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A crankshaft for a ninety degree V-type six cylinder engine, the crankshaft comprising:
a first crank arm extending between a first main journal and a first crank pin;
a second flying arm extending between the first crank pin and a second crank pin;
a third crank arm extending between the second crank pin and a second main journal;
a fourth crank arm extending between the second main journal and a third crank pin;
a fifth flying arm extending between the third crank pin and a fourth crank pin;
a sixth crank arm extending between the fourth crank pin and a third main journal;
a seventh crank arm extending between the third main journal and a fifth crank pin;
an eighth flying arm extending between the fifth crank pin and a sixth crank pin;
a ninth crank arm extending between the sixth crank pin and a fourth main journal;
wherein the first main journal, the second main journal, the third main journal, and the fourth main journal are each coaxial with each other and extend along and are disposed concentrically about a crankshaft axis;
wherein the first crank pin, the second crank pin, the third crank pin, the fourth crank pin, the fifth crank pin, and the sixth crank pin are each disposed parallel with and laterally offset from the crankshaft axis;
a first counterweight connected to the first crank arm;
a second counterweight connected to the third crank arm;
a third counterweight connected to the seventh crank arm; and
a fourth counterweight connected to the ninth crank arm;
characterized by the lack of a counterweight connected to at least one of the fourth crank arm or the sixth crank arm.

2. A crankshaft as set forth in claim 1 further comprising a crankshaft plane extending through a central axis of the first crank pin and the crankshaft axis, and wherein:
the first counterweight is oriented so that a plane extending from a center of gravity of the first counterweight to the crankshaft axis is rotated between 170 degrees and 190 degrees from the crankshaft plane in a clockwise direction;
the second counterweight is oriented so that a plane extending from a center of gravity of the second counterweight to the crankshaft axis is rotated between 135 degrees and 155 degrees from the crankshaft plane in a clockwise direction;
the third counterweight is oriented so that a plane extending from a center of gravity of the third counterweight to the crankshaft axis is rotated between 5 degrees and 25 degrees from the crankshaft plane in a clockwise direction; and
the fourth counterweight is oriented so that a plane extending from a center of gravity of the fourth counterweight to the crankshaft axis is rotated between 310 degrees and 330 degrees from the crankshaft plane in a clockwise direction.

3. A crankshaft as set forth in claim 2 wherein:
the first counterweight is oriented so that the plane extending from the center of gravity of the first counterweight to the crankshaft axis is rotated approximately 178 degrees from the crankshaft plane in the clockwise direction;
the second counterweight is oriented so that the plane extending from the center of gravity of the second counterweight to the crankshaft axis is rotated approximately 145 degrees from the crankshaft plane in the clockwise direction;
the third counterweight is oriented so that the plane extending from the center of gravity of the third counterweight to the crankshaft axis is rotated approximately 15 degrees from the crankshaft plane in the clockwise direction; and
the fourth counterweight is oriented so that the plane extending from the center of gravity of the fourth counterweight to the crankshaft axis is rotated approximately 320 degrees from the crankshaft plane in the clockwise direction.

4. A crankshaft as set forth in claim 1 wherein:
the first counterweight includes a mass of between 1200 grams and 1400 grams;
the second counterweight includes a mass of between 750 grams and 950 grams;
the third counterweight includes a mass of between 950 grams and 1150 grams; and
the fourth counterweight includes a mass of between 900 grams and 1100 grams.

5. A crankshaft as set forth in claim 4 wherein:
the mass of the first counterweight is approximately equal to 1310 grams;
the mass of the second counterweight is approximately equal to 870 grams;
the mass of the third counterweight is approximately equal to 1050 grams; and
the mass of the fourth counterweight is approximately equal to 1004 grams.

6. A crankshaft as set forth in claim 1 wherein:
the first counterweight, the third counterweight, and the fourth counterweight each include a dovetail angle of between 120 degrees and 140 degrees; and
the second counterweight includes a dovetail angle of between 100 degrees and 120 degrees.

7. A crankshaft as set forth in claim 6 wherein:
the dovetail angle of the first counterweight is approximately equal to 133 degrees;
the dovetail angle of the second counterweight is approximately equal to 112 degrees;
the dovetail angle of the third counterweight is approximately equal to 130 degrees; and
the dovetail angle of the fourth counterweight is approximately equal to 130 degrees.

8. A crankshaft as set forth in claim 1 wherein:
the first counterweight includes a dovetail Weighted Radius (WR) between the range of 60 Kilogram Millimeters (KgMm) and 80 KgMm;
the second counterweight includes a dovetail WR between the range of 40 KgMm and 60 KgMm;
the third counterweight includes a dovetail WR between the range of 50 KgMm and 70 KgMm; and
the fourth counterweight includes a dovetail WR between the range of 50 KgMm and 70 KgMm.

9. A crankshaft as set forth in claim 8 wherein:
the dovetail WR of the first counterweight is approximately equal to 74 KgMm;
the dovetail WR of the second counterweight is approximately equal to 53 KgMm;

the dovetail WR of the third counterweight is approximately equal to 60 KgMm; and the dovetail WR of the fourth counterweight is approximately equal to 60 KgMm.

10. A crankshaft as set forth in claim 1 further comprising a separation distance measured axially along the crankshaft axis and disposed between either the first crank arm and the first crank pin, or between the sixth crank pin and the ninth crank arm.

11. A crankshaft as set forth in claim 10 wherein the separation distance is between the range of two millimeters (2 mm) and forty millimeters (40 mm).

12. A crankshaft as set forth in claim 1 further comprising a reluctor wheel.

13. A crankshaft as set forth in claim 12 wherein the reluctor wheel is disposed between the ninth crank arm and the fourth main journal.

14. A crankshaft as set forth in claim 1 wherein the first counterweight, the second counterweight, the third counterweight and the fourth counterweight are the only counterweights connected to the arms.

15. A crankshaft comprising:
   a first main journal, a second main journal, a third main journal, and a fourth main journal each coaxially disposed along a crankshaft axis;
   a first crank pin, a second crank pin, a third crank pin, a fourth crank pin, a fifth crank pin, and a sixth crank pin each parallel with the crankshaft axis and radially offset from the crankshaft axis;
   a first crank arm including a first counterweight and connecting the first main journal and the first crank pin;
   a third crank arm including a second counterweight and connecting the second crank pin and the second main journal;
   a seventh crank arm including a third counterweight and connecting the third main journal and the fifth crank pin; and
   a ninth crank arm including a fourth counterweight and connecting the sixth crank pin and the fourth main journal;
   a crankshaft plane extending through a central axis of the first crank pin and the crankshaft axis, wherein:
   the first counterweight is oriented so that a plane extending from a center of gravity of the first counterweight to the crankshaft axis is rotated between 170 degrees and 190 degrees from the crankshaft plane in a clockwise direction;
   the second counterweight is oriented so that a plane extending from a center of gravity of the second counterweight to the crankshaft axis is rotated between 135 degrees and 155 degrees from the crankshaft plane in the clockwise direction;
   the third counterweight is oriented so that a plane extending from a center of gravity of the third counterweight to the crankshaft axis is rotated between 5 degrees and 25 degrees from the crankshaft plane in the clockwise direction; and
   the fourth counterweight is oriented so that a plane extending from a center of gravity of the fourth counterweight to the crankshaft axis is rotated between 310 degrees and 330 degrees from the crankshaft plane in the clockwise direction.

16. A crankshaft as set forth in claim 15 further comprising:
   a fourth crank arm connecting the second main journal and the third crank pin;
   a sixth crank arm connecting the fourth crank pin and the third main journal; and
   characterized by the lack of a counterweight connected to at least one of the fourth crank arm and the sixth crank arm.

17. A crankshaft as set forth in claim 15 further comprising a separation distance measured axially along the crankshaft axis and disposed between either the first crank arm and the first crank pin, or between the sixth crank pin and the ninth crank arm.

18. A crankshaft as set forth in claim 17 wherein the separation distance is between the range of two mm (2 mm) and forty millimeters (40 mm).

19. A crankshaft as set forth in claim 15 wherein:
   the first counterweight is oriented so that the plane extending from the center of gravity of the first counterweight to the crankshaft axis is rotated approximately 178 degrees from the crankshaft plane in the clockwise direction;
   the second counterweight is oriented so that the plane extending from the center of gravity of the second counterweight to the crankshaft axis is rotated approximately 145 degrees from the crankshaft plane in the clockwise direction;
   the third counterweight is oriented so that the plane extending from the center of gravity of the third counterweight to the crankshaft axis is rotated approximately 15 degrees from the crankshaft plane in the clockwise direction; and
   the fourth counterweight is oriented so that the plane extending from the center of gravity of the fourth counterweight to the crankshaft axis is rotated approximately 320 degrees from the crankshaft plane in the clockwise direction.

* * * * *